(12) United States Patent
Ochiai et al.

(10) Patent No.: US 6,224,093 B1
(45) Date of Patent: *May 1, 2001

(54) VEHICLE STEERING APPARATUS

(75) Inventors: Fumiharu Ochiai; Kouichi Sato; Koji Tanida, all of Wako (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/139,520

(22) Filed: Aug. 25, 1998

(30) Foreign Application Priority Data

Aug. 27, 1997 (JP) .................................. 9-231423

(51) Int. Cl.⁷ .............................. B60R 21/16; B62D 5/04
(52) U.S. Cl. ............................ 280/731; 74/552; 180/446
(58) Field of Search ........................... 280/731; 74/552; 180/402, 446

(56) References Cited

U.S. PATENT DOCUMENTS

| D. 249,499 | * | 9/1978 | LeRose | 74/552 |
| T875,019 | * | 6/1970 | Haddad et al. . | |
| 2,909,941 | * | 10/1959 | Guest | 74/552 |
| 3,714,844 | * | 2/1973 | Tsuda | 74/552 |
| 4,658,927 | * | 4/1987 | Kanazawa | 180/422 |
| 5,004,035 | | 4/1991 | Burke et al. . | |
| 5,005,860 | * | 4/1991 | Mori et al. | 280/731 |

FOREIGN PATENT DOCUMENTS

| 62-55263 | 3/1987 | (JP) . |
| 3-151115 | 6/1991 | (JP) . |
| 6-227423 | 8/1994 | (JP) . |

* cited by examiner

*Primary Examiner*—Paul N. Dickson
(74) *Attorney, Agent, or Firm*—Merchant & Gould P.C.

(57) ABSTRACT

A vehicle steering handle comprises a boss portion disposed centrally thereof for accommodating an air bag, right and left grip portions disposed vertically on right and left sides of the boss portion for allowing gripping by a driver, and upper and lower horizontal connector portions connecting respective upper and lower ends of the right and left grip portions to thereby make the handle generally rectangular in shape. At least the upper connector portion extends substantially linearly. As a result, it becomes possible for the air bag to suitably deform to thereby support a collision load of a driver. Further, with the upper connector portion extending linearly, improved view to vehicle instruments is provided.

3 Claims, 10 Drawing Sheets

VEHICLE STEERING APPARATUS

BACKGROUND OF THE INVENTION

1. Field of the Invention

The present invention relates to an improvement in a vehicle steering handle and more particularly to a steering handle suitable for a vehicle with a steering angle ratio variable steering apparatus.

2. Description of the Related Art

A steering handle for a steering angle ratio variable steering apparatus is known from, for example, Japanese Patent Laid-Open Publication No. SHO-62-55263.

The known steering handle comprises a boss portion disposed centrally thereof, right and left spoke portions extending rightwardly and leftwardly from a lower part of the boss portion, and right and left grip portions rising from respective ends of the right and left spoke portions.

With the boss portion being positioned between lower halves of the grip portions and upper halves of the grip portions defining a space therebetween, the known steering handle thus has a generally U-shaped configuration.

However, since there exists an open space between the upper halves of the grip portions and above the boss portion, the conventional steering handle encounters a problem when disposing and housing an air bag in the boss portion as in a steering wheel of ordinary construction.

Namely, the steering handle does not have a support member for supporting a front surface of an upper half of an air bag as the air bag is operated and inflated. Thus, when a driver is hit against the inflated air bag, the upper half of the air bag moves forwardly through the space between the upper halves of the grip portions and thus fails to restrict or mitigate the forward movement of an upper half of the driver.

Generally, spatial layout and construction around the steering handle do not allow provision of the driver's air bag at other places than the handle. Due to the capacity of the air bag, the boss portion would be the best position for the air bag to be disposed.

As explained above, the right and left grip portions of the steering handle take the form of a rod rising upwardly. This arrangement requires the driver to firmly hold the handle for making a maximum steering angle. This imposes a heavy burden on the driver. Further, since the right and left grip portions have free ends, there is a fear that the hands of the driver will slip off the grip portions. Since a return operation of the steering handle is done with the driver's hand loosely holding the grip portions, there arises another fear that the fingers of the driver will come off the grip portions during such a return operation.

SUMMARY OF THE INVENTION

It is therefore an object of the present invention to provide a vehicle steering handle which provides improved view of meters and like instruments, allows for the provision of an air bag on a boss portion disposed centrally of the handle so that the air bag can function fully, and prevents slipping off of driver's fingers therefrom.

According to a first aspect of the present invention, there is provided a vehicle steering handle comprising: a boss portion disposed centrally of said handle for housing an air bag therein; right and left grip portions disposed vertically on right and left sides of the boss portion for allowing gripping by a driver and positioned on vehicle widthwise sides when said steering handle is placed at a neutral position; and upper and lower horizontal connector portions connecting respective upper and lower ends of the right and left grip portions so that the handle becomes generally rectangular in shape, at least the upper connector portion extending substantially linearly.

By virtue of the linearly extending upper connector portion, upon inflation of the air bag, the upper and lower connector portions are brought to be held against a front surface of an upper part of the air bag. As a result, it become possible for the air bag to suitably deform to sufficiently support the collision load of a driver. Further, since the upper connector portion is linear, it does not block view of vehicle instruments such as a speed meter positioned forwardly of the handle.

According to a second aspect of the present invention, there is provided a vehicle steering handle comprising: a boss portion disposed centrally of said handle; right and left grip portions disposed vertically on right and left sides of the boss portion for allowing gripping by a driver and positioned on vehicle widthwise sides when the steering handle is placed at a neutral position; and upper and lower horizontal connector portions connecting respective upper and lower ends of the right and left grip portions so that the steering handle becomes generally rectangular in shape, at least the upper connector portion extending substantially linearly, the right and left grip portions being ring-shaped and rotatable about a rotational center of the steering handle.

With the upper connector portion extending linearly, the handle has no projection that presents a bar to view of the speed meter and like instruments. Further, since the right and left grip portions are ring- or arc-shaped with the upper and lower connector portions connected thereto to form a loop, the driver's fingers will not easily come out of the handle.

In a preferred form, the lower connector portion extends substantially linearly.

Preferably, the right and left grip portions are provided with projections protruding inwardly thereof.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

The following description is merely exemplary in nature and is in no way intended to limit the invention or its application or uses.

Figure 1:
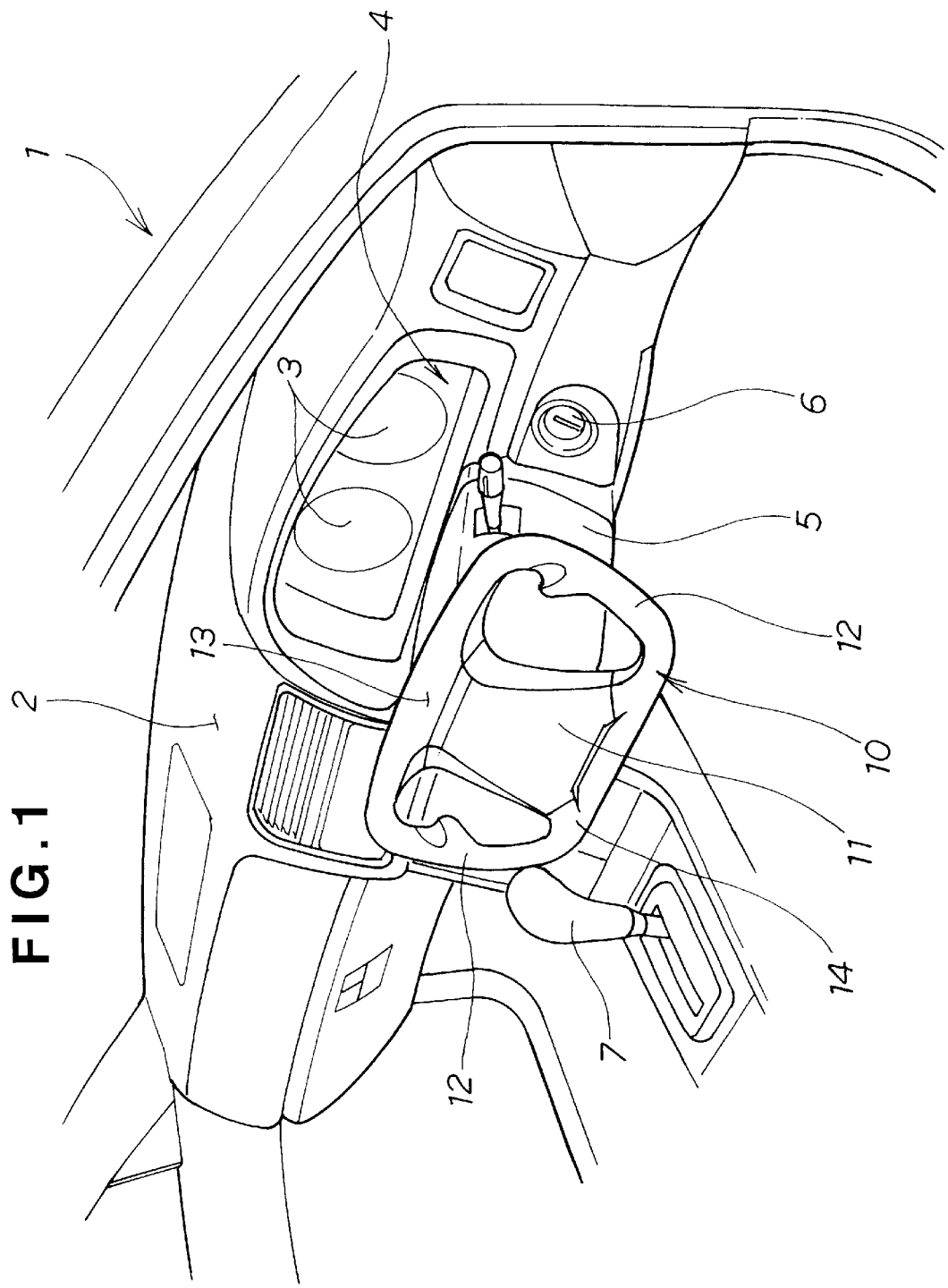
FIG. 1 is a perspective view showing the interior of a vehicle employing a steering handle according to the present invention.

In FIG. 1, reference numeral 1 denotes a vehicle such as a passenger car. On the right side of the front seats is a driver's seat. An instrument panel 2 is disposed forwardly of the front seats and extends laterally of the vehicle 1. A display portion 4 having instruments 3 such as a speedometer and a tachometer is disposed rightwardly of the instrument panel 2.

Below the instrument panel 2, there is disposed a steering handle 10 protruding toward the driver's seat. Reference numeral 5 designates a steering or handle column provided at one end of the handle 10 for forming a base portion of the latter. The handle column 5 accommodates therein a steering shaft and the like. Reference numerals 6 and 7 respectively designate an ignition switch and a shift lever for varying the speed of the vehicle 1.

Figure 2:
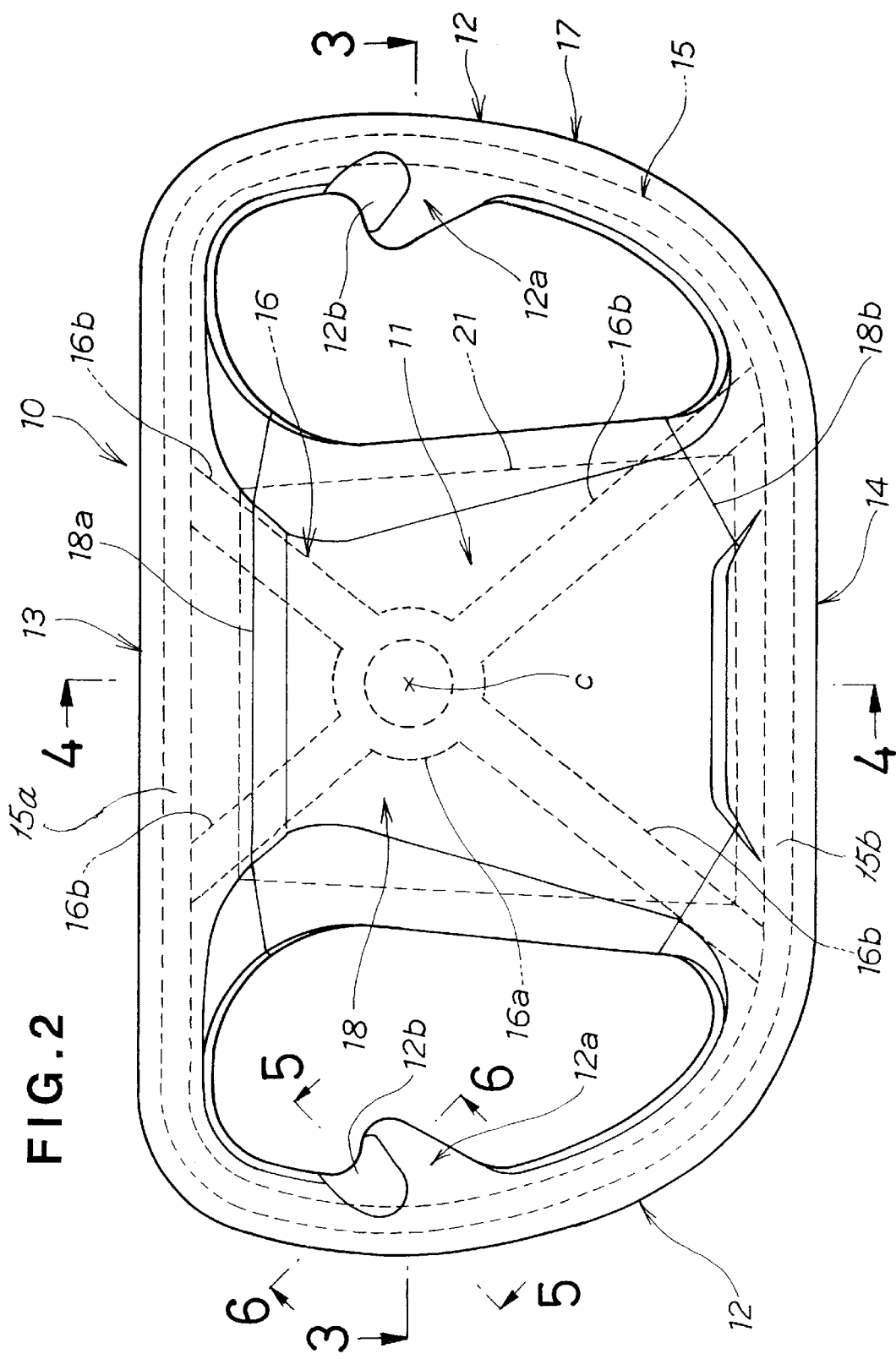
FIG. 2 is a front view illustrating the steering handle shown in FIG. 1.

As shown in detail in FIGS. 2 to 6, the handle 10 has a frame-like configuration elongated laterally of the vehicle 1 as it is placed at a neutral position as shown in FIG. 2. The handle 10 comprises a boss portion 11 provided centrally thereof, right and left grip portions 12, 12 provided on right and left sides of the boss portion 11 with a space therebetween, an upper connector portion 13 connecting upper ends of the right and left grip portions 12, 12 and extending laterally of the vehicle 1 as the handle 10 is placed at the neutral position, and a lower connector portion 14 connecting lower ends of the right and left grip portions 12, 12 and extending laterally of the vehicle 1 as the handle 10 is placed at the neutral position.

The right and left grip portions 12, 12 take the form of arcs arranged symmetrically and are rotatable about a rotational center "c". The upper and lower connector portions 13, 14 extend linearly in parallel spaced relation to each other while the right and left grip portions are curved to bulge outwardly symmetrically, thereby making the steering handle generally rectangular in shape. The upper and lower connector portions 13, 14 and the right and left grip portions 12, 12 are provided in such a manner as to surround the boss portion 11. The central boss portion 11 is integrally connected at an upper end portion thereof to lengthwise intermediate portions of the upper and lower connector portions 13, 14.

The upper and lower connector portions 13, 14 and the right and left grip portions 12, 12 extend continuously to form a loop. The boss portion 11 has upper and lower ends continuing with the lengthwise intermediate portions of the upper and lower connector portions 13, 14. In the upper and lower connector portions 13, 14 and the right and left grip portions 12, 12, a horizontally elongate loop-like core metal 15 is embedded to thereby provide the handle with rigidity.

Figure 5:
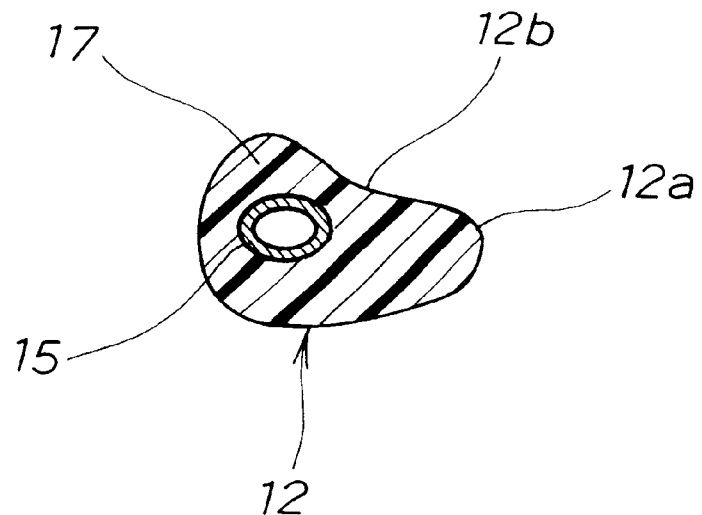
FIG. 5 is a cross-sectional view taken along line 5—5 of FIG. 2.
Figure 6:
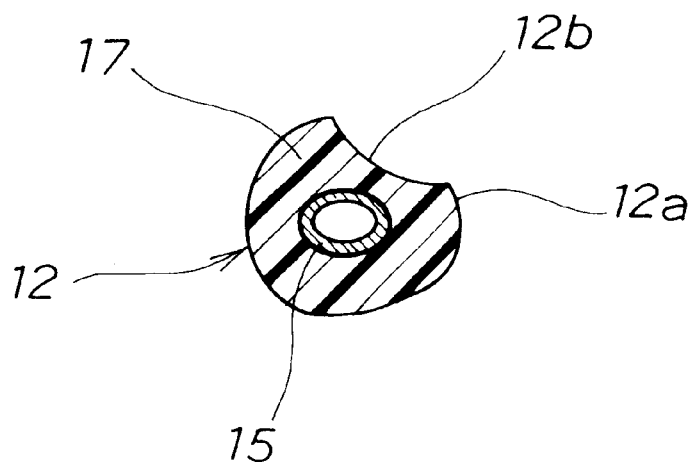
FIG. 6 is a cross-sectional view taken along line 6—6 of FIG. 2.

As shown in FIGS. 5 and 6, the core metal 15 is formed of a metallic pipe covered with a thermoplastic resin to provide an outer configuration of the handle 10.

Figure 3:
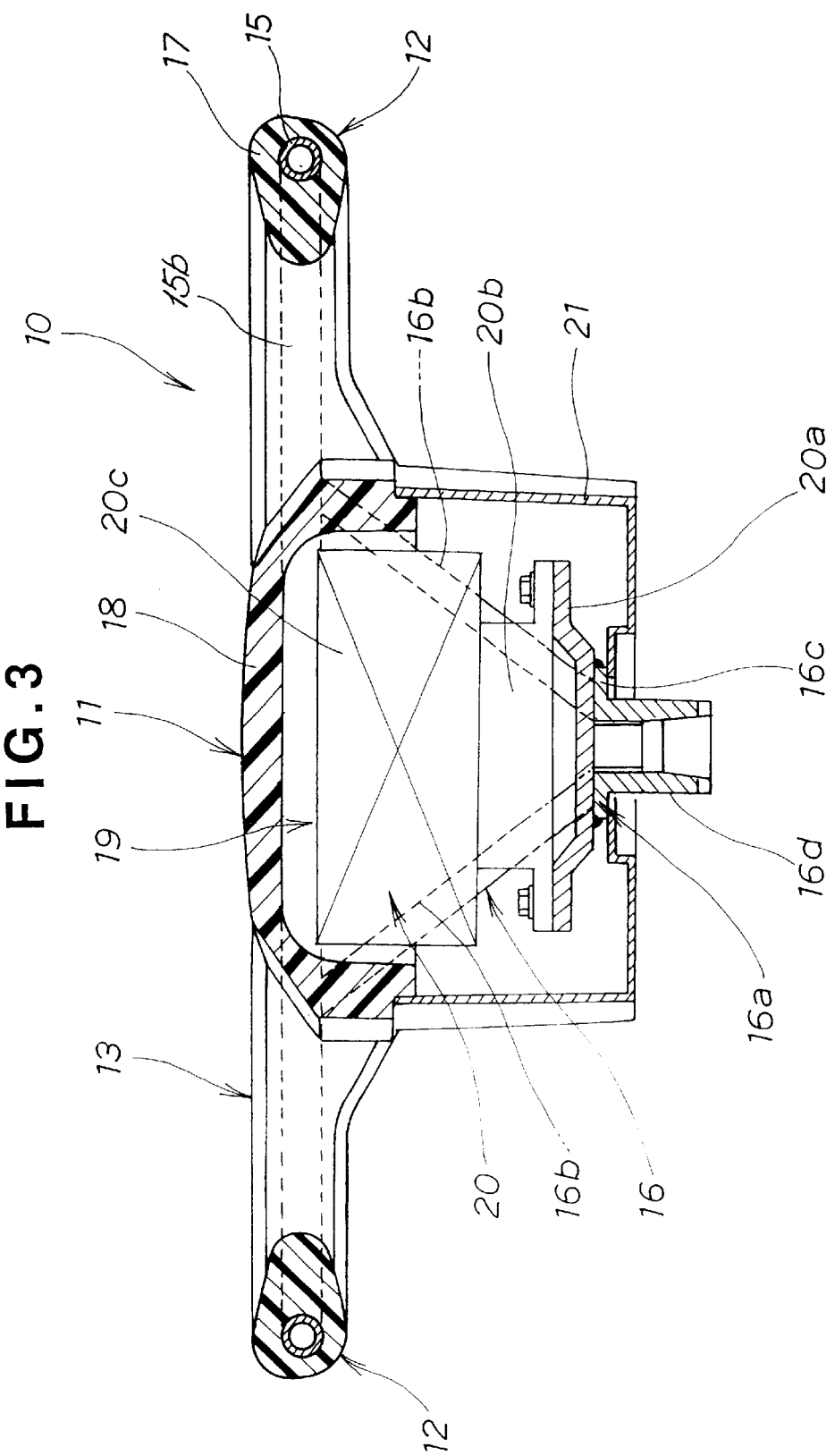
FIG. 3 is a cross-sectional view taken along line 3—3 of FIG. 2.
Figure 4:
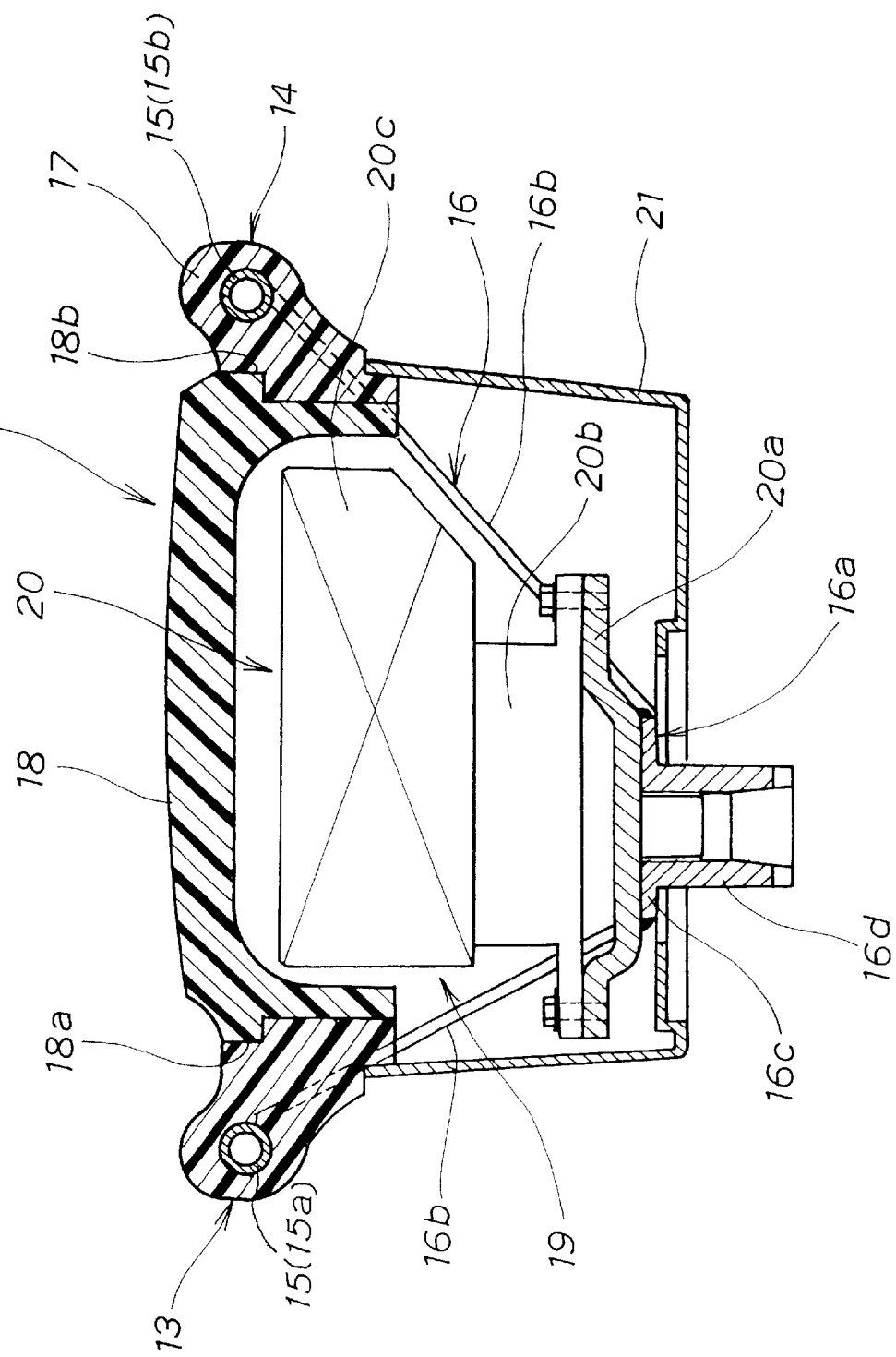
FIG. 4 is a cross-sectional view taken along line 4—4 of FIG. 2.

On an under surface of the boss portion 11, there is disposed a center frame 16, as shown in FIGS. 2 to 4. The center frame 16 includes a ring portion 16a provided centrally thereof, four leg portions 16b extending radially from an outer periphery of the ring portion 16a. Each leg portion 16b is integrally joined at its upper end to the core metal 15.

As best shown in FIGS. 3 and 4, lower ends of the leg portions 16b are connected to the ring portion 16a of the center frame 16 in such a manner as to form an inverted trapezoid with the ring portion 16b serving as a bottom thereof. The ring portion 16a is provided with a cylindrical portion 16d having a flange 16c at an upper end thereof. The handle 10 is connected to an upper end of the steering shaft, which in turn is threadedly engaged in the cylindrical portion 16d.

The upper and lower ends of the leg portions 16b of the center frame 16 are integrally joined with intermediate portions of respective upper and lower horizontal portions 15a, 15b of the core metal 15 in laterally spaced relation to each other. As mentioned above, the outer periphery of the core metal 15 is completely covered with an outer cover material 17 of resin or the like to thereby form a so-called wheel portion of the handle. Also, a pad 18 formed of resin or the like is disposed over the center frame 16 with upper and lower ends 18a, 18b of the pad 18 abutted on vertically intermediate portions of the outer cover material 17 to thereby form an overall outer appearance of the handle 10.

Below the pad 18 of the handle boss portion 11, there is defined a space 19 surrounded by the leg portions 16b of the center frame 16 and the ring portion 16a provided at a lower end of the enter frame 16. In this space 19, an air bag 20 may be provided. FIGS. 3 and 4 show the air bag 20 disposed below the boss portion 11. On the ring portion 16a, there is disposed a stay 20a serving as a base plate. Disposed on the stay 20a is a driving apparatus 20b. A bag 20c is extendably provided on the driving apparatus 20b.

A cover 21 having a U-shaped cross section is provided below the boss portion 11 in such a manner as to surround the center frame 16 and the air bag 20. The cover 21 has one end facing an upper part of the handle column 5.

Inside the grip portions 12, 12 of the handle 10, projections 12a, 12a are provided at symmetric positions, as best shown in FIG. 2. The projections 12a, 12a are also symmetric in configuration.

Referring again to FIG. 2, the projections 12a, 12a are provided substantially centrally of the grip portions 12, 12 such that they are located closer to the upper extending portion 13 than to the lower extending portion 14. The projections 12a, 12a have areas or widths set to be substantially equal to or greater than widths of driver's thumbs.

Recessed portions 12b, 12b for receiving the thumbs are symmetrically provided on the projections 12a, 12a. FIGS. 5 and 6 illustrate the sections of the projections 12a, 12a. As shown in FIG. 5, the cross-section of the recessed portion 12b is elongated longitudinally of one thumb and gently sloped upwardly toward a front end thereof. The recessed portions 12b, 12b are provided such that their longitudinal axes are inclined inwardly of the handle 10 and intersect at above the handle 10 in FIG. 2.

FIG. 6 is a cross-sectional view of the recessed portion 12b taken in a direction perpendicular to the length of the recessed portion 12b. As illustrated in this figure, the recessed portion 12b is inwardly curved or arc-shaped so that it allows natural receiving of an inner surface of a thumb. The recessed portion 12b is also inclined slightly inwardly of the handle. Therefore, it becomes possible for the driver to hold or grip the handle 10 with right and left hands symmetrically inclined inwardly of the handle 10.

Figure 7:
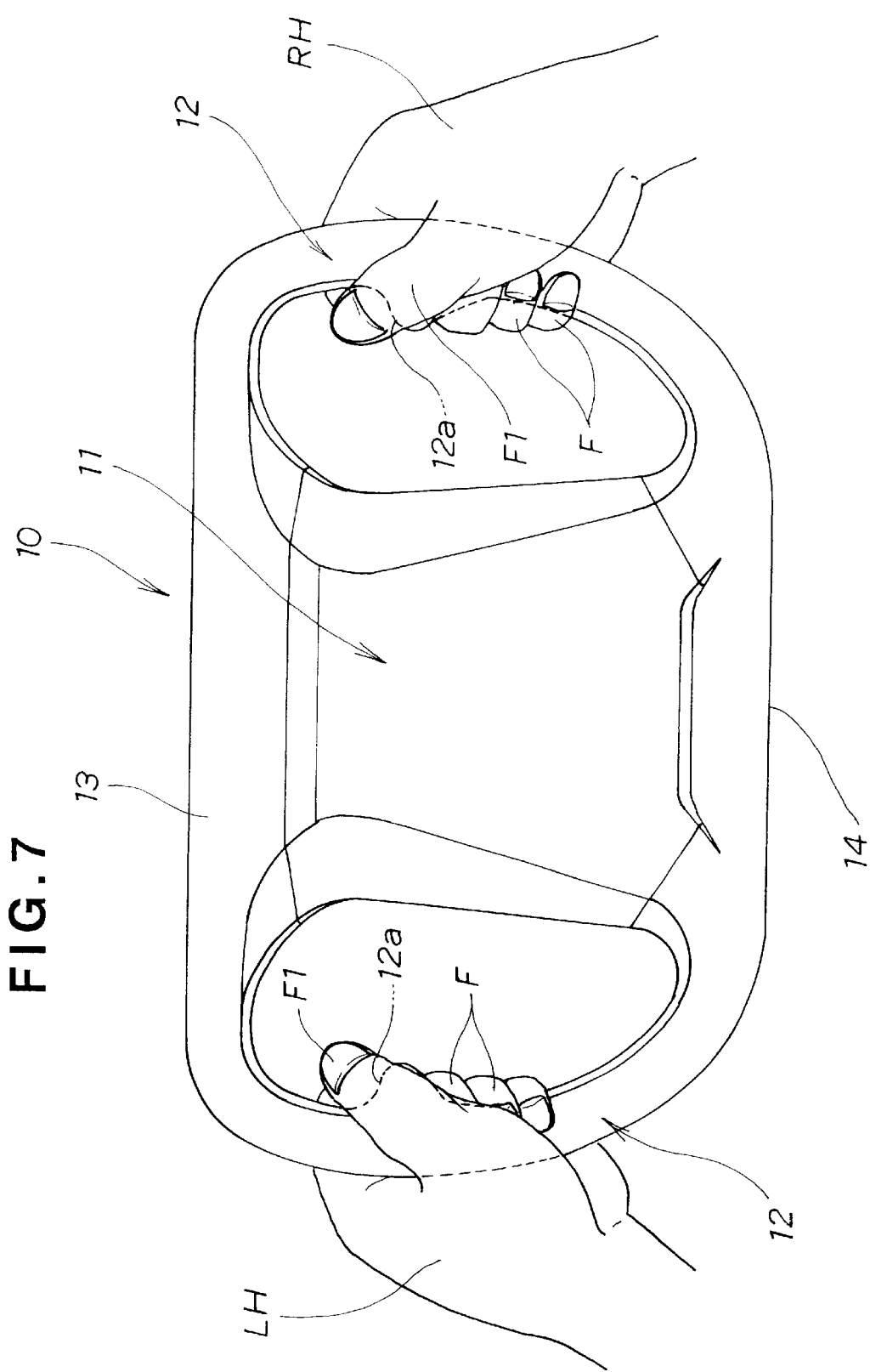
FIG. 7 illustrates the steering handle as held by hands.

With this arrangement, the handle 10 can be operated to steer the vehicle with the right and left grip portions 12, 12 held by right and left hands RH, LH, respectively, as shown in FIG. 7.

In FIG. 7, for gripping the grip portions 12, 12, palms of the right and left hands RH, LH are held against the back sides of vertically intermediate portions of the right and left grip portions 12, 12 while thumbs F1, F1 are positioned to confront the projections 12a, 12a with the inner surfaces of the thumbs F1, F1 received in the recessed portions 12b, 12b. Other fingers F are held against interior surfaces of the grip portions 12, 12.

Upon gripping the handle 10, since the thumbs F1, F1 are held against the projections 12a, 12a, the other fingers positioned inside the thumbs and the grip portions 12, 12 are hooked onto the projections 12a, 12a.

Thus, the handle can be turned with the other fingers hooked onto the projections 12a, 12a. Further, since the thumbs F1, F1 are pressed against the projections 12b, 12b upon operation of the handle, it becomes possible for the driver to steer the vehicle with the handle lightly held by his hands, thereby rendering the handle operation easy. As a result, driver's fatigue resulting from the operation of the handle can be reduced significantly. Further, since the thumbs are held against the projections 12a, 12a and the other fingers positioned inside the grip portions 12, 12 are limited in their upward movement by the projections 12a, 12a, optimal handle grip positions are provided in a fixed fashion. Moreover, since the recessed portions 12b, 12b are provided at the projections 12a, 12a and inclined inwardly of the handle, the thumbs can be received therein comfortably and securely, thereby enabling smooth and reliable steering operation.

As explained above, since the upper connector portion 13 of the handle 10 linearly extends laterally of the vehicle, as best shown in FIG. 1, the handle 10 has no portion bulging upwardly of the boss portion 11 to block view of the instruments 3.

The air bag 20 disposed below the pad 18 forming the boss portion 11 expands toward the driver upon activation thereof.

Figure 10:
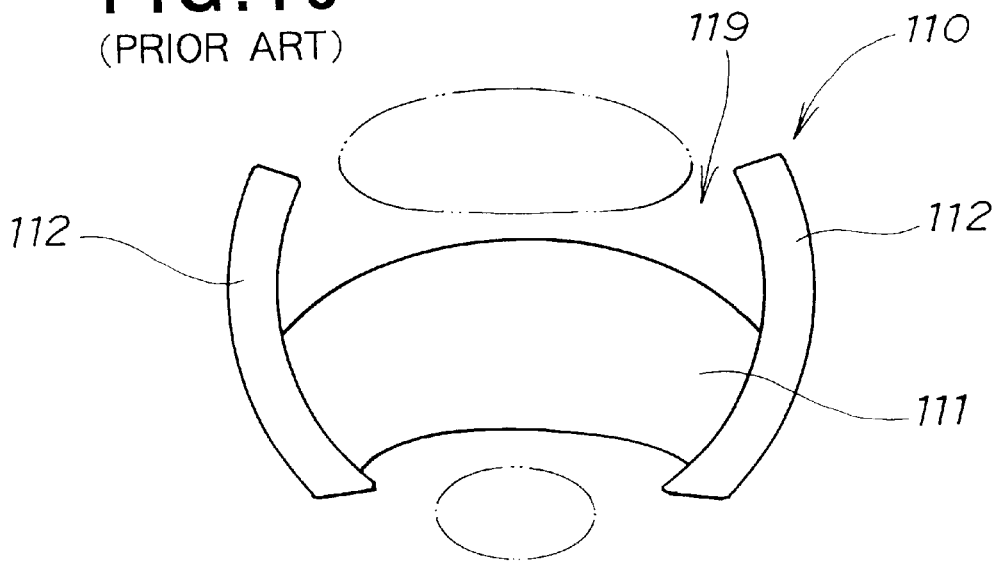
FIG. 10 is a schematic view illustrating a problem associated with a conventional steering handle.

In a conventional handle 110 as shown in FIG. 10, a boss portion 111 is opened upwardly of a boss portion 111. Thus, when the air bag 20 is deformed forwardly of the vehicle by bumping of the driver thereagainst, such a handle does not have any part for supporting the air bag 20. The deformed air bag is thus pushed forwardly through a space 119 opening forwardly and upwardly of right and left grip portions 112, 112, resulting in failure to effectively support the load of the driver.

Figure 9:
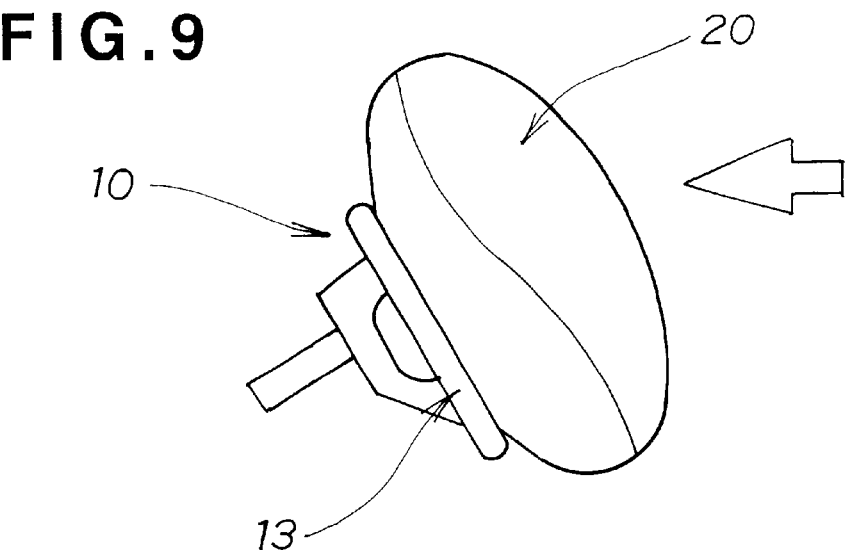
FIG. 9 is a schematic view illustrating an air bag as inflated.

In contrast, in the present invention, since the upper and lower horizontal connector portions 13, 14 extend linearly between the right and left grip portions 12, 12 with the air bag 20 enclosed by the boss portion 11 and the upper and lower connector portions 13, 14, the inflated air bag 20 deformed by the load resulted from the bump of the driver thereagainst is supported by the upper and lower extending portions 13, 14, thereby making the air bag perform its function. When the air bag 20 provided at the handle 10 is fully expanded and the load of the driver is applied to the air bag 20 as shown by an arrow of FIG. 9, it can deform in a required manner, thereby achieving its inherent function.

Figure 8:
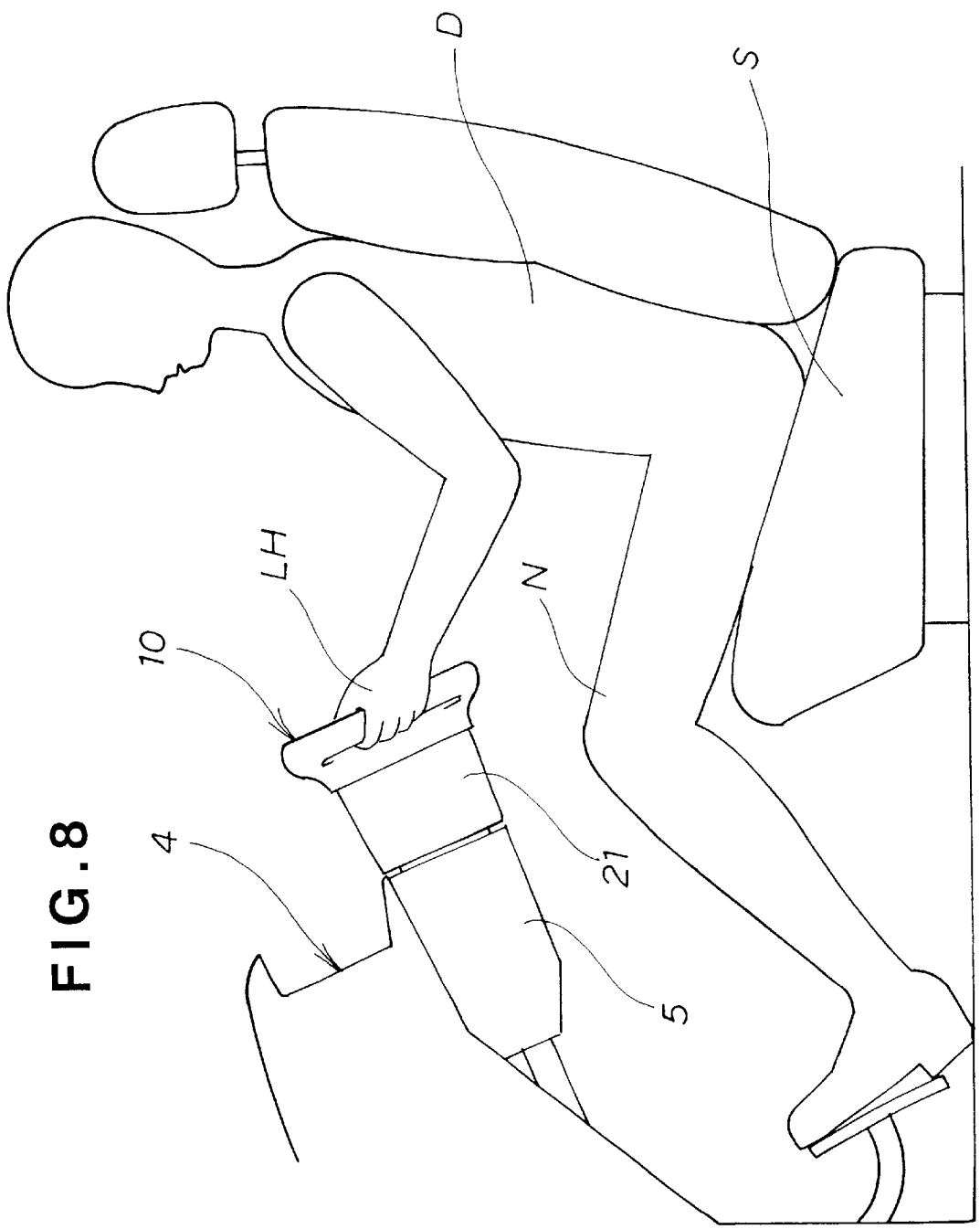
FIG. 8 is a side view showing how a driver sits at and holds the steering handle.

As discussed above, the lower part of the inventive handle 10 is formed by the lower horizontal connector portion 14 extending linearly laterally of the vehicle. Thus, the handle 10, unlike ordinary steering wheels, has no downwardly bulged portion. Consequently, as shown in FIG. 8, there is defined a large space between knees N of the driver D and the lower horizontal connector portion 14 of the handle 10, thus making it easy for the driver D to take or leave his seat S.

Figure 11:
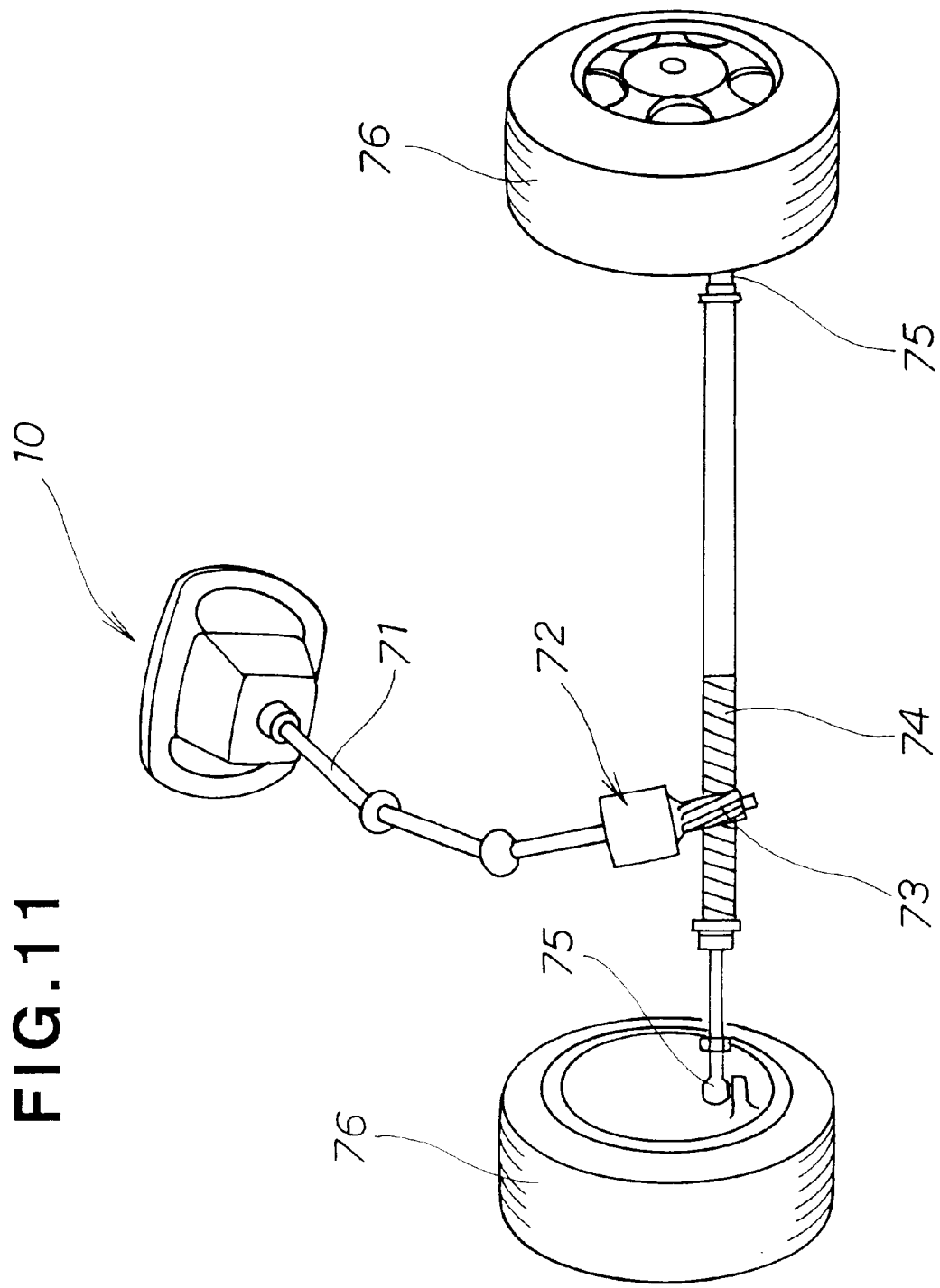
FIG. 11 is a schematic view showing a steering mechanism of a vehicle.
Figure 12:
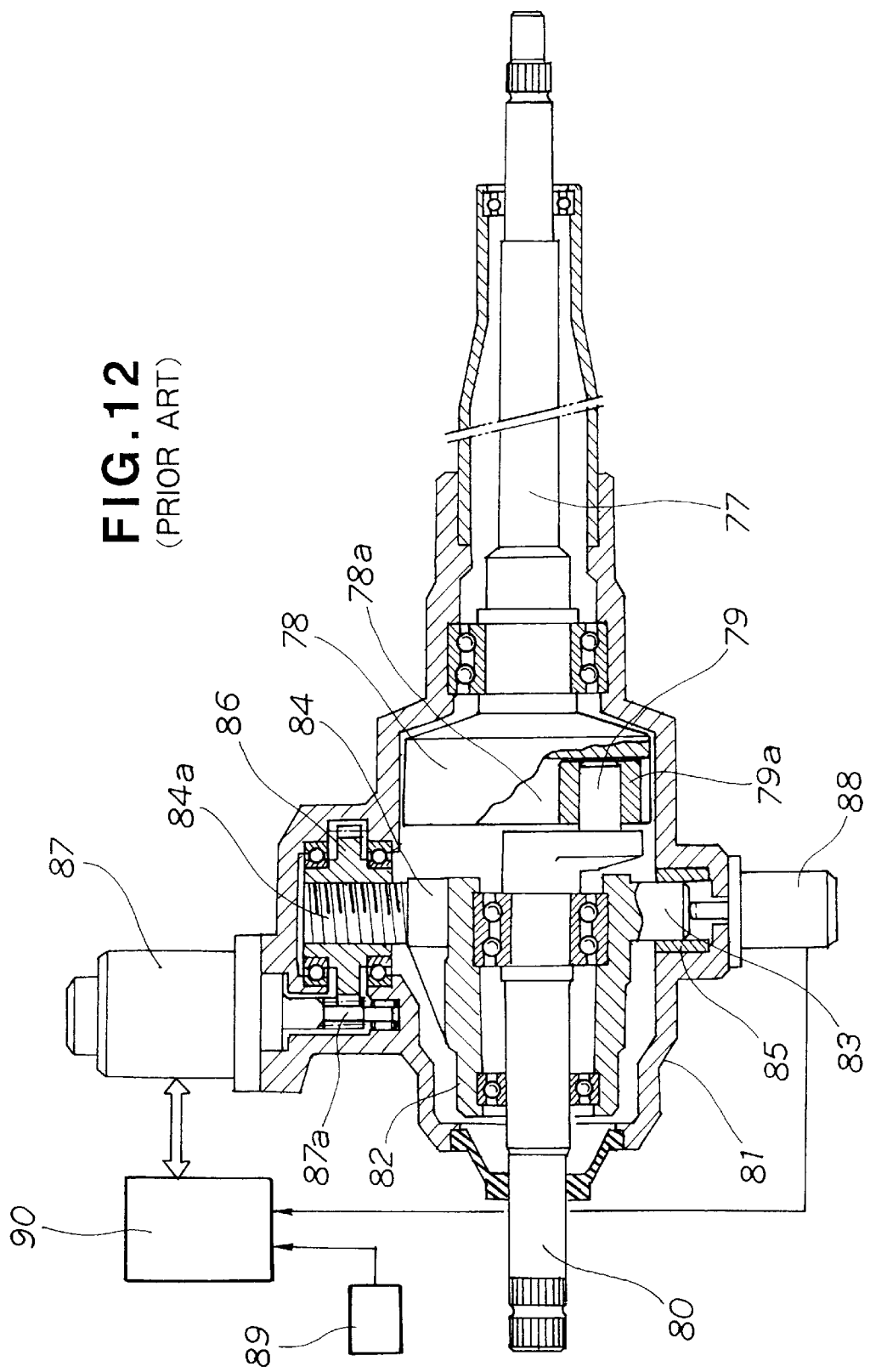
FIG. 12 is a vertical sectional view illustrating an example steering angle ratio varying apparatus.

The inventive handle 10 is suitable for use with a steering angle ratio variable steering apparatus. Referring to FIGS. 11 and 12, discussion will be made next as to the handle 10 as applied to a typical steering angle ratio variable steering apparatus.

FIG. 11 schematically shows the steering apparatus. As the handle 10 is turned to rotate a steering shaft 71, a steering input of the steering shaft is transmitted to a steering angle ratio varying apparatus 72 via a joint, an intermediate shaft and the like. Thereafter, a pinion shaft 73 outputs the steering input to a rack shaft 74 meshing with the pinion shaft 73, such that the rack shaft 74 is moved to right and left directions to thereby pivot or steer right and left steered wheels 76, 76 by means of knuckle arms 75, 75 provided on opposite ends of the rack shaft 74.

The steering angle ratio varying apparatus 72 is known from, 10 for example, Japanese Patent Laid-Open Publication No. HEI-6-227423 assigned to the assignees of this application and will be described with reference to FIG. 12 hereof. A first shaft 77 is rotated by turning the steering shaft 71. This causes a second shaft 79, fitted into a groove 78a of a coupling 78 via a slider 79a, to eccentrically rotate with respect to a third shaft 80.

The steering input transmitted to the first shaft 77 is then outputted to the third shaft 80 provided integrally with the second shaft 79, thereby moving the rack shaft 74 to right-and-left directions by means of the pinion 73 and an oldham coupling (not shown). With this arrangement, it becomes possible to impart a nonlinear characteristic to the relation between an input angle of the handle 10 and an output angle of the third shaft 80, thereby providing a desired steering characteristic which leads to improved steering operation.

The third shaft 80 provided integrally with the second shaft 79 is supported by a support member 82 supported within a casing 81 so that the support member 82 may be vertically moved in FIG. 12. The support member 82 is provided with vertically protruding support pins 83, 84. The lower support pin 83 is vertically movably supported by a slide bearing 85 provided within the casing 81 while the upper support pin 84 includes external threads 84a formed circumferentially thereof. The upper support pin 84 is screwed into a spur gear 86 forming internal threads at inner periphery thereof. The spur gear 86 is meshed with an output pinion 87a of a motor 87.

A displacement sensor 88 disposed on one end of the lower support pin 83 generates an eccentric signal of the third shaft 80 supported by the support member 82, i.e., amount of movement of the support member 82, while a vehicle velocity sensor 89 generates a running velocity signal indicative of a vehicle velocity.

For controlling the motor 87, an amount of movement of the support member 82, generated by the displacement sensor 88 disposed at an end of the lower support pin 83, that is, an eccentric signal relative to the third shaft 80 supported by the support member 82 and a running velocity signal generated by the vehicle velocity sensor 89 are inputted to a control device 90, followed by making a target eccentric amount set in correspondence to the running speed conform to an actual eccentric amount fed from the displacement sensor 88.

The described arrangement enables a steered angle of the steered wheels relative to the rotational angle of the handle 10 to become large as the vehicle is running at low speed and small as the vehicle is running at high speed.

Obviously, various minor changes and modifications of the present invention are possible in the light of the above teaching. It is therefore to be understood that within the scope of the appended claims, the present invention may be practiced otherwise than as specifically described.

What is claimed is:

1. A vehicle steering apparatus for a vehicle with steering angle ratio variable steering, comprising:

steering handle;

means for steering the vehicle so that wheels being steered have a larger steered angle as vehicle speed is lowered relative to a rotational angle of said steering handle and have a smaller steered angle as vehicle speed is increased relative to the rotational angle of said steering handle;

an air bag;

a boss portion disposed centrally of said handle for housing said bag therein, said boss portion including a pad and a frame having a ring portion with a space for said air bag being formed between said pad and said ring portion;

said steering handle having right and left grip portions disposed vertically on right and left sides of said boss portion for allowing gripping by a driver and positioned on vehicle widthwise sides when said steering handle is placed at a neutral position; and said steering handle also having upper and lower horizontal connector portions connecting respective upper and lower ends of said right and left grip portions so that said handle becomes generally rectangular in shape, said upper and lower connector portions extending substantially linearly;

leg portions extending radially from an outer periphery of said ring portion to intermediate portions of said upper and lower horizontal connector portions;

wherein said right and left grip portions are appropriate for said steering means and said substantially linear upper and lower connector portions provide support for said bag when it inflates.

2. A vehicle steering handle apparatus according to claim 1, wherein said right and left grip portions are ring-shaped and rotatable about a rotational center of said steering handle.

3. A vehicle steering handle according to claim 2, wherein said right and left grip portions have projections protruding inwardly thereof, said projections having recessed portions which are inwardly curved to receive an inner surface of a thumb.

* * * * *